(12) United States Patent
Johnston

(10) Patent No.: US 7,022,294 B2
(45) Date of Patent: Apr. 4, 2006

(54) COMPACT REACTOR

(75) Inventor: Anthony Johnston, New South Wales (AU)

(73) Assignee: Meggitt (UK) Limited, Dorset (GB)

( * ) Notice: Subject to any disclaimer, the term of this patent is extended or adjusted under 35 U.S.C. 154(b) by 964 days.

(21) Appl. No.: 09/769,561

(22) Filed: Jan. 25, 2001

(65) Prior Publication Data

US 2001/0021359 A1 Sep. 13, 2001

Related U.S. Application Data

(60) Provisional application No. 60/184,007, filed on Feb. 22, 2000.

(30) Foreign Application Priority Data

Jan. 25, 2000 (GB) ............................................. 0001699
Jul. 13, 2000 (GB) ............................................. 0017189

(51) Int. Cl.
*F28D 7/00* (2006.01)
*B01J 8/02* (2006.01)

(52) U.S. Cl. ...................... 422/198; 422/200; 422/198; 422/188

(58) Field of Classification Search ................ 422/198, 422/191, 193, 188, 189, 200
See application file for complete search history.

(56) References Cited

U.S. PATENT DOCUMENTS

| | | | | |
|---|---|---|---|---|
| 3,663,179 A | * | 5/1972 | Mehta et al. ................ | 422/148 |
| 3,941,869 A | * | 3/1976 | Fuchs ...................... | 423/239.1 |
| 4,075,092 A | | 2/1978 | White et al. | |
| 4,101,281 A | | 7/1978 | Pagani | |
| 4,153,855 A | | 5/1979 | Feingold | |
| 4,190,079 A | | 2/1980 | White et al. | |
| 4,231,979 A | | 11/1980 | White et al. | |
| 4,714,592 A | | 12/1987 | Zanma et al. | |
| 5,180,480 A | | 1/1993 | Manz | |
| 5,494,641 A | | 2/1996 | Krstanovic | |
| 5,525,311 A | * | 6/1996 | Girod et al. ................ | 422/200 |
| 5,540,899 A | | 7/1996 | Koves | |
| 5,585,074 A | | 12/1996 | Zardi et al. | |
| 5,727,618 A | | 3/1998 | Mundinger et al. | |
| 5,744,100 A | | 4/1998 | Krstanovic | |
| 5,804,701 A | | 9/1998 | Berger | |
| 5,989,502 A | * | 11/1999 | Nelson et al. .............. | 422/194 |
| 6,432,369 B1 | * | 8/2002 | Mulvaney et al. .......... | 422/213 |

FOREIGN PATENT DOCUMENTS

| | | |
|---|---|---|
| EP | 0 386 693 | 3/1990 |
| EP | 0 386 692 | 6/1990 |
| EP | 0 484 534 | 5/1992 |
| EP | 0 539 834 | 10/1992 |
| WO | WO 95/01834 | 1/1995 |
| WO | WO 96/12316 | 4/1996 |
| WO | WO 96/39260 | 12/1996 |
| WO | WO 96/42004 | 12/1996 |
| WO | WO 98.32535 | 7/1998 |

OTHER PUBLICATIONS

D. Reay, "*Learning from Experiences with Compact Heat Exchangers*", Doc. No. XP–002167972, Caddett Analyses Series No. 25, pp. 32–42, 85–86, 98, 141–142, and XI–XII (Jun. 1999).

* cited by examiner

*Primary Examiner*—Kiley S. Stoner
*Assistant Examiner*—Len Tran
(74) *Attorney, Agent, or Firm*—Boyle Fredrickson Newholm Stein & Gratz S.C.

(57) ABSTRACT

A reactor comprises a plurality of reaction zones divided by heat exchanger panels but in fluid communication via the panels, the reaction zones being arranged in a spiral configuration whereby the reaction zones form a flow path for reactants that extends between a central part of the reactor and an outer peripheral part thereof.

20 Claims, 5 Drawing Sheets

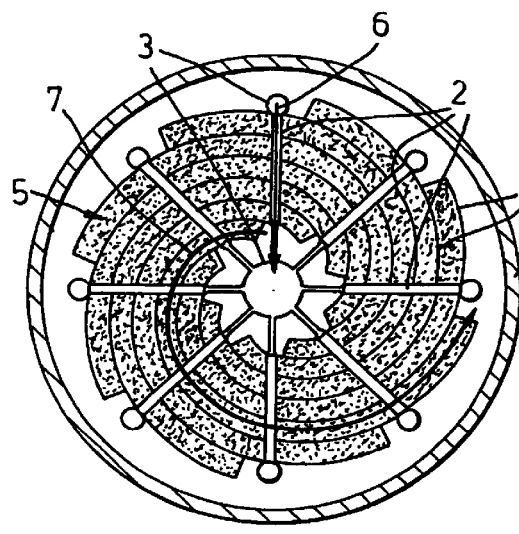
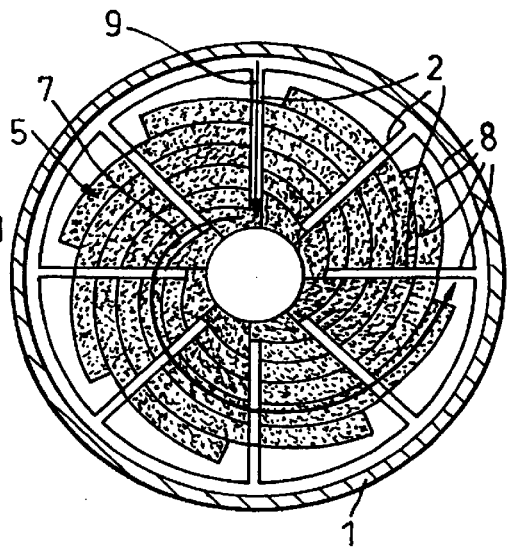
*Fig. 3*   *Fig. 4*
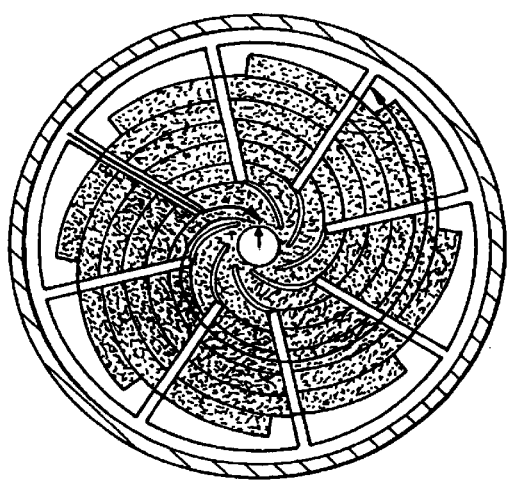
*Fig. 5*   *Fig. 6*

COMPACT REACTOR

CROSS-REFERENCE TO RELATED APPLICATIONS

This application claims priority under 35 U.S.C. §119(e) to U.S. Provisional Patent Application No. 60/184,007, entitled Catalytic Bed Reactor, filed Feb. 22, 2000, and under 35 USC §119(a) to G.B. 0001699.8, filed Jan. 25, 2000 and G.B. 0017189.2, filed Jul. 13, 2000, the entirety of each of which is incorporated herein by reference.

FIELD OF THE INVENTION

The present invention is applicable in the field of chemical engineering and especially relates to improvements in chemical reactors. In general the invention relates to control of the reactant temperature during an exothermic or endothermic reaction. Particularly the invention provides a printed circuit reactor system (PCR) and process control method which is intended to provide that the reactants are kept as close as practicable to a temperature at which the reaction rate will be optimum for a given product content.

BACKGROUND OF THE INVENTION

Control of the temperature of reactions within an acceptable range has been widely investigated and the chemical industry has devised several arrangements, those commonly used being discussed in standard references and texts, e.g. one might consider the general teachings by Octave LEVENSPIEL in Chapter 19 of Chemical Reaction Engineering (published by John Wiley & Sons).

The prior art includes a conventional reactor designed to offer more control over the reactant temperature and this is known as the staged adiabatic packed bed reactor. This system uses an arrangement wherein a number of discrete, spaced apart zones of reaction are provided with means therebetween to control the temperature of the products leaving a first zone of reaction prior to entering the next reaction zone. No heat exchanging means is provided to control the temperature of the reaction in the zones of the reaction. Thus the reactant fluid entering the reactor at a desired temperature passes through a packed bed containing catalyst. Upon exiting this first stage, the reactant gas and any products will have a temperature higher or lower than that of the initial temperature depending upon the reaction thermal characteristics. A heat exchanger then heats or cools the reactant gas to a second desired temperature, which may or may not be equivalent to the temperature of the first, before passing to the next packed bed i.e. the second stage. This sequence is repeated until the desired conversion is obtained. Thus the temperature profile of the reaction will be stepped within an acceptable range of temperature, and will therefore not be truly isothermal.

The preferred heat exchanger panel for the purposes of the invention is one formed from a plurality of plates superposed and diffusion bonded to form a stack of plates, wherein fluid passages are defined in said stack by virtue of a pre-treatment of said plates wherein each plate is selectively configured to provide channeled or blank surfaces according to the desired pattern of fluid passages by a treatment to remove surface material e.g. by chemical etching, or hydraulic milling, or the like process to a desired depth. Optionally the chemical treatment may be augmented by a mechanical treatment using a suitable tool.

Such a pre-treatment of the plates is conducted in a manner analogous to manufacture of printed circuit boards (PCBs) and for this reason the heat exchanger design can be described as a printed circuit heat exchanger (PCHE). The application of the diffusion bonding technique for metal plates is well understood in the art of metal working and is applied for a variety of purposes e.g. in medical prosthesis manufacture.

This design of the PCHE has been proven by the designers of the proposed PCR system since 1985 when these compact heat exchangers were first introduced.

A PCR type of reactor was designed by the present applicants and is the subject of a separate patent application (Ref:32 46271 WO-). Such a reactor is formed to provide at least one reaction zone, bounded by a heat exchanger formed from a plurality of plates superposed and diffusion bonded to form a stack of plates, wherein fluid channels are defined in said stack by virtue of pre-treatment of said plates wherein each plate is selectively configured according to the desired pattern of channels by a chemical treatment to remove surface material e.g. by chemical etching, to a desired depth. The fluid channels defined in the stack provide the opportunity to arrange for various reactant fluids to be conveyed in channels arranged in a heat exchange relationship with discrete channels containing at least one auxiliary fluid for controlling the temperature of the reactants.

Considering the example of a known ammonia converter, for a given ammonia content in the reactants there is a temperature for which the desired reaction rate is at a maximum. This is because the rate of synthesis of ammonia is the net result of the competing rates of the forward and reverse reactions. Consequently, by monitoring and controlling the temperature, it is possible to determine a temperature that favours the forward production reaction more than the reverse product dissociation reaction. In fact it is found that whilst increased temperature generally causes an increase in reaction, and indeed the desired forward product formation reaction rate increases favourably with temperature, at a certain approach to equilibrium conditions the concurrent increased rate of the reverse reaction begins to dominate, and to slow the overall synthesis rate. Maximum conversion in a bed of given size is therefore achieved if conditions remain on the maximum rate line. This is shown graphically in FIG. 1.

Ammonia synthesis typically takes place at high pressures, greater than 100 bar and therefore creating bed volume is relatively expensive. Furthermore, the catalyst itself is costly. Consequently, an important element of ammonia synthesis reactor design is to attempt to maintain the bed conditions as closely as possible to the maximum reaction rate line, and hence to maximise the rate of ammonia synthesis in a bed of a given size.

Various approaches have been taken to achieving this result, mainly falling into the categories of:

1. Quench-cooled multi-bed converters, in which cold reactant feed is injected between beds of catalyst,
2. Tube-cooled converters, in which tubes carrying cold reactant are embedded in the catalyst bed, and
3. Indirectly cooled multi-bed exchangers, in which heat is extracted from the hot reactants passing between beds in heat exchangers cooled by cold reactant feed.

An example of a quench type converter is disclosed in U.S. Pat. No. 3,663,179 wherein there is provided a vertically oriented container or reactor vessel, which is provided with an internal catalyst basket in which a bed or charge of catalyst particles is disposed. The basket is spaced from the container wall, and the feed fluid stream such as synthesis gas is passed onto the lower portion of the container and external to the basket. The feed fluid rises through the annular space between the basket and the container wall, and thus serves to cool the container and act as insulation against the thermal effects or hot spots generated within the catalyst bed. The rising warmed feed fluid stream is then heated to a suitable catalysis temperature by an internal heat exchanger. The hot fluid then flows to the catalyst bed in which the reaction takes place.

A perforated pipe is disposed in the catalyst bed, and a cold quench fluid, which may be of a composition comparable to the feed stream is passed through the pipes and distributed into the hot reacting gas within the catalyst bed, to provide a cooling effect and thereby moderate the catalytic reaction.

Ammonia synthesis is exothermic, typically operating in the 350° C. to 500° C. range, and the conversion factor is relatively low, typically less than 20%. As a result, it is possible for the cold feed stream to the reactor to be used to extract the reaction heat, at the same time preheating the cold feed stream to the required reaction temperatures. It is conventional practice to use the feed stream as a cooling medium in this way in ammonia converters. Related documents U.S. Pat. No. 4,230,669 and U.S. Pat. No. 4,230,680 describe such a converter in which the cold feed stream is used to extract the reaction heat and also includes a cold feed bypass line such that a controllable volume of the cold feed stream can by-pass the heat exchangers and therefore better control of the reactant temperature can be achieved.

This converter is an example of an indirectly cooled multi-bed exchanger as briefly outlined at point 3 above. It is an approach to bed cooling that is generally preferred by those in the art. In prior art converters though, only a very crude tracking of the maximum reaction rate curve is achievable in the reactor, due to the difficulties in cost-effectively arranging for more than two beds with inter-cooling by the feed stream. The general form of the temperature profile achieved with the common two-stage arrangement is illustrated in FIG. 2. The proposal outlined in U.S. Pat. Nos. 4,230,669 and 4,230,680 mentioned above actually has three catalyst beds, but even so performance leaves room for improvement and the design cannot be considered compact.

Other examples of ammonia converters are described in the publication "Ammonia and Synthesis Gas, Recent and Energy-saving Processes" edited by F J Brykowski and published by Noyes Data Corporation in 1981.

An object of the present invention is to provide an improved reactor design, particularly one that is useful for the purposes of ammonia conversion and the like reactions, and is furthermore of a relatively compact design.

SUMMARY OF THE INVENTION

Accordingly, the invention to be more particularly described herein provides a reactor including a plurality of reaction zones divided by heat exchanger panels but in fluid communication via said panels, and forming thereby in succession a production flow path, said reactor comprising a vessel having a curved wall, and a plurality of heat exchanger panels arranged within said wall at an angle thereto such as to extend inwardly to the interior of the vessel, thereby defining between successive panels and said wall at least one reaction zone, and wherein baffles are provided within the reaction zone and arranged to extend from a heat exchanger surface to define a boundary for the reaction zone and to thereby impose a desired configuration upon said production flow path, whereby said flow path extends between a central part of the reactor to an outer peripheral part thereof.

An advantage of this design is that within a relatively compact reactor, in terms of overall bulk, and "footprint" in ground space dedicated to the reactor, a large number of catalytic beds can be accommodated.

Preferably, the reactor vessel is of a cylindrical design, and said heat exchanger panels are arranged about a central point, preferably radially, to thereby define a plurality of sectors each containing at least one reaction zone.

The reactor may be one in which a particulate material is to be confined within the reaction zone, e.g. catalyst, and at least one wall bounding said reaction zone comprises a screen that is permeable to reaction fluids, but inhibits loss of particulate material from the reaction zone.

Preferably the reactor vessel contains catalyst that is retained by containment screens, wherein the said screens are conveniently arranged concentrically, such that the catalytic reaction zone is contained between these concentric walls.

Preferably also each sector is divided into a plurality of reaction zones by baffles arranged to extend from a heat exchanger surface to respectively define a boundary for each reaction zone, preferably in a curved configuration, and to form a spiral flow path between the centre of the vessel and the curved vessel wall. It will be understood that a spiral flow path is one that lies in a plane and that reactants following such a path will recede from or advance towards a central point. Furthermore, such baffles may comprise corrugations in order to better absorb differential thermal expansion between various elements of the reactor.

Typically, the reaction zone comprises a catalyst bed, and fluid reactants are introduced to the reactor so as to enter the vessel centrally to pass along the production flow path between successive catalyst beds through the heat exchanger panels interposed therebetween to the outer part of the vessel in an outwardly progressing spiral path. Thus, generally in practice of the invention a large fraction of the vessel volume is occupied by catalyst. It will be recognised that as the reactant stream passes through the outwardly progressing path the effective catalytic bed length increases, so that a substantial reaction step is still achievable even when the amounts of reactant present are becoming depleted.

The supply of heat exchange medium to the heat exchanger panels may be such that the direction of flow is generally inwardly from the outer part of the reactor towards the centre thereof. Thus in relation to a reactant flow progressing outwardly from the centre, the flow of heat exchanger medium is counter-flow. In other applications, the flow of heat exchange medium may be from the centre towards the outside of the reactor, if a co-current flow arrangement is desired.

Preferably, the heat exchangers panels are entirely of the printed circuit heat exchanger type (PCHE). Typically in such an arrangement, the heat transfer dimensions are smaller than catalyst particle dimensions, ensuring that the temperature profiles inherent in heat transfer to fluids in passages are not significant relative to the catalyst particle size. Also, the dimensions of the heat transfer are relatively small to the bed depth, so that any passage-scale temperature profiles occupy only a very small proportion of the individual catalyst bed lengths, e.g. typically up to about 200 mm. This contrasts significantly with the prior art use of exchanger tubes of say 25 mm outer diameter, which essentially cause downstream wakes in the temperature profiles which are then necessarily of a scale that is significantly larger than the individual catalyst particles and extend across at least a significant proportion of each catalyst bed.

It will be understood that the plates having the appropriate channels defined by etching or the like are stacked and diffusion bonded together to form heat exchanger panels, and that such panels so formed can, if necessary, be juxtaposed and joined e.g. by welding to provide a larger panel of a desired height and width to match the required catalyst bed cross-sectional area. Use of blank (un-etched plates) is appropriate in some instances to complete a panel and close the open side of channels formed in an adjacent etched plate. The reference to panels is for convenience and is not intended to indicate a dimensional limitation. However, it will be appreciated that the dimensions of the heat exchanger unit will vary according to a chosen reactor design, and that currently available manufacturing equipment may impose some practical limitations on panel size in one step. If it is desired to form relatively large size panels, such practical limitations can be readily overcome by juxtaposition of a plurality of panels of a size formed within the capacity of the available equipment and joining thereof by a suitable method such as welding. In this way a variety of shapes and sizes of the PCHE panel can be constructed.

In an illustrative arrangement to be described more fully hereinbelow, the reactants pass through six adiabatic reaction zones containing beds of catalyst and five heat exchange panels. The heat transfer medium path can be a single pass from the outer part of the heat exchanger to the inner or vice versa. However, multi-passing of heat exchanger medium across the heat exchanger may be advantageous, e.g. by adoption of serpentine passages in the heat exchanger panel. The flow passages may adopt a zig-zag configuration.

In preferred embodiments, the heat transfer medium path makes more than one pass along the length of each heat exchanger panel terminating either at the opposite end to entry, or at the same end depending upon whether the number of passes is odd or even.

Advantageously the reactant cold feed stream is utilised as the heat transfer medium, and therefore passes radially through the heat transfer channels of the PCHE panels before following a spiral path through the catalyst beds and reactant channels of the PCHE panels. In a preferred embodiment provision is made for a greater degree of control of the reactant and feed temperatures by means of a cold feed bypass to the first reaction stage at the centre of the containment vessel.

Control of the temperature profile in the reactant path in the reactor is achievable by appropriate design of the heat exchanger to achieve adjustments in the aspects affecting heat exchange effectiveness at each point of thermal contact between reactants and heat exchange fluids. These adjustments can be considered in modifying the heat transfer coefficients, by varying the tortuosity of the flow paths, e.g. number of convolutions or zigzags and angle between turns, passage dimensions. The heat exchange area may be modified by changing the number of passages carrying fluids through the heat exchanger, this being most conveniently implemented on the reactant side of the exchanger.

DESCRIPTION OF THE DRAWINGS

The invention will now be further explained in more detail by way of a few non-limiting embodiments described by way of example only with reference to the accompanying drawings in which:

FIG. 3 shows schematically the general configuration of a spiral/radial flow reactor;

FIG. 4 shows schematically a spiral/radial flow reactor adapted particularly to be an ammonia converter;

FIG. 5 shows schematically an alternative ammonia converter layout, with cold feed bypass provision;

FIG. 6 shows the multi-pass flow arrangement for cold feed in a PCHE panel;

MODES FOR CARRYING OUT THE INVENTION

Figure 1:
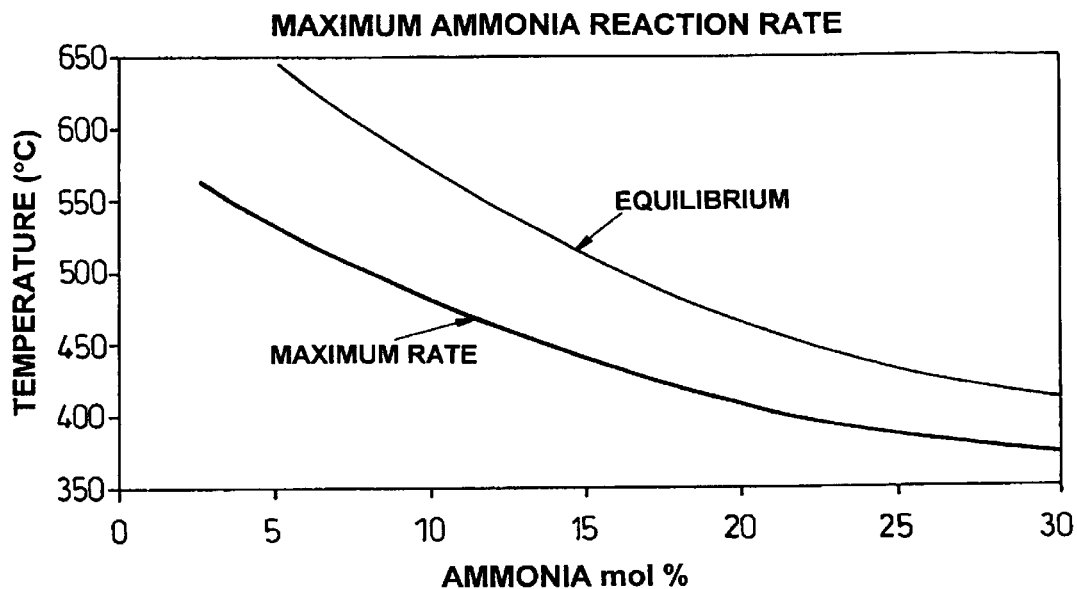
FIG. 1 is a graphical representation of equilibrium and maximum reaction rate curves for ammonia synthesis.

The general principle of the spiral/radial flow reactor is illustrated in FIG. 3. This shows a containment shell 1 wherein eight PCHE cores 2 are configured in a radial pattern, evenly spaced around the central axis of the containment shell 1. At each end of each PCHE core 2 is a cooling medium manifold 3. The manifold 3 at the central axis of the containment shell 1 is universal to all the PCHE cores 2.

Beds of catalyst 5 are located between the PCHE cores 2, beginning at the inner end of the PCHE cores 2 and are curved such that each subsequent bed 5 is radially further from the longitudinal axis of the containment shell 1 so forming a spiral. A different spiral of catalyst bed 5 begins at the inner end of each of the PCHE cores 2. Catalyst beds forming part of one spiral are separated from those of other spirals by baffles 8. As the beds 5 are arranged in a spiral pattern between the PCHE cores 2, the effective path length through a catalytic bed 5 between heat exchanger panels tends to increase as its radial distance from the longitudinal axis of the containment shell increases.

In the simplest case the cooling medium path 6 is a single pass from the outer circumference to the inner (although the opposite direction is possible depending on the circumstances). In operation, the reactants follow the reactant path 7 passing through six beds 5 and five heat exchange panels 2, in counter-flow contact. Note that as each bed 5 increases in length, a substantial reaction step is possible even when the reactants are becoming depleted.

FIG. 4 shows an improved version of the present invention particularly adapted for ammonia synthesis. In this embodiment there are no manifolds, the reactants emerging from the catalyst beds 5 are cooled by the cold reactant feed. The cold reactants are fed into the outer circumference and separated from the catalyst beds 5 by baffles 8. The cold feed stream 9 passes radially in through the PCHE panels 2 and is progressively heated by the reactants emerging from the preceding adiabatic beds 5 up to the reaction temperature for the first reaction stage. On exiting the PCHE core 2 the reactants enter the first catalyst bed and are directed by baffles 8 through successive PCHE cooling cores 2 and catalyst beds 5 (of generally increasing length) in an outward spiral. On exiting the final catalyst bed the product stream is collected by baffles and led to an exit nozzle.

In implementing such an arrangement for an industrial scale converter, the diameter of the assembly shown in FIG. 4 is approximately 1800 mm, allowing it to fit within a 2 m inner diameter vessel. The PCHE panels are approximately 45×500 mm in cross section, with each cross-flow pass of the reactants approximately 100 mm wide. The reactant flow cross-section is therefore approximately 0.8 $m^2$ per meter of height, and the flow length is approximately 2.6 m. Approximately 1.9 $m^3$ of catalyst volume is contained per meter of height. Clearly by modifying the number of PCHE radial spokes and the reactant flow width, various combinations of flow area and path length through the bed can be achieved.

An alternative configuration is shown in FIG. 5. In this embodiment provision is made for control of the reactant and feed temperatures by means of a cold feed bypass to the first reaction stage at the centre of the containment vessel. Cold feed emerges from the central bypass delivery duct through, for example, orifices, nozzles or sintered plugs. As a further refinement to assist in controlling temperatures, the main feed stream may take more than one pass along the length of the PCHE panel, as shown in FIG. 6.

Figure 2:
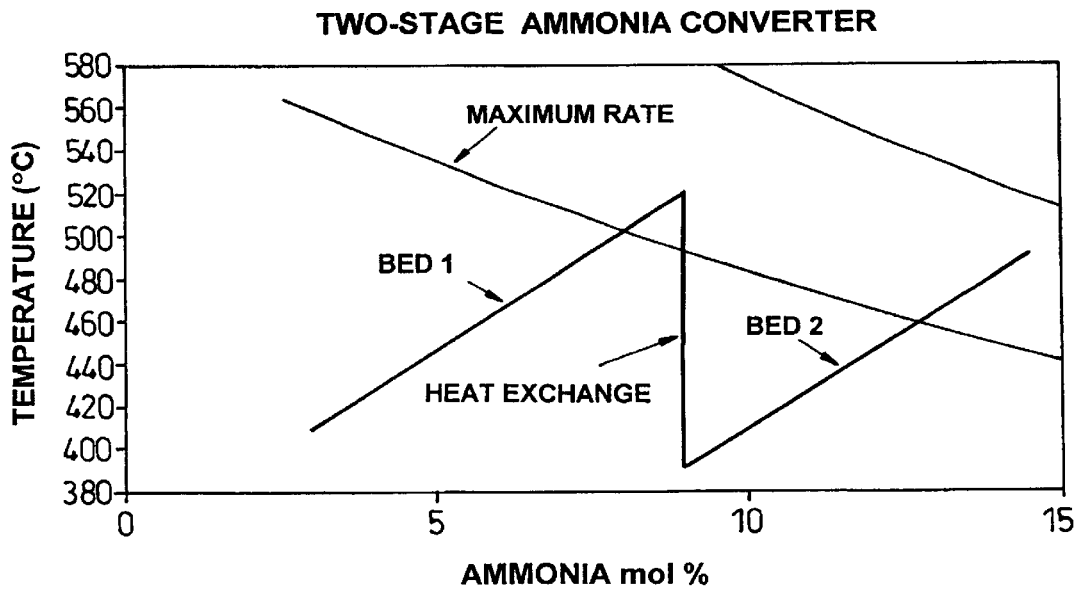
FIG. 2 is a graphical representation of the general form of a two-stage ammonia temperature profile.
Figure 7:
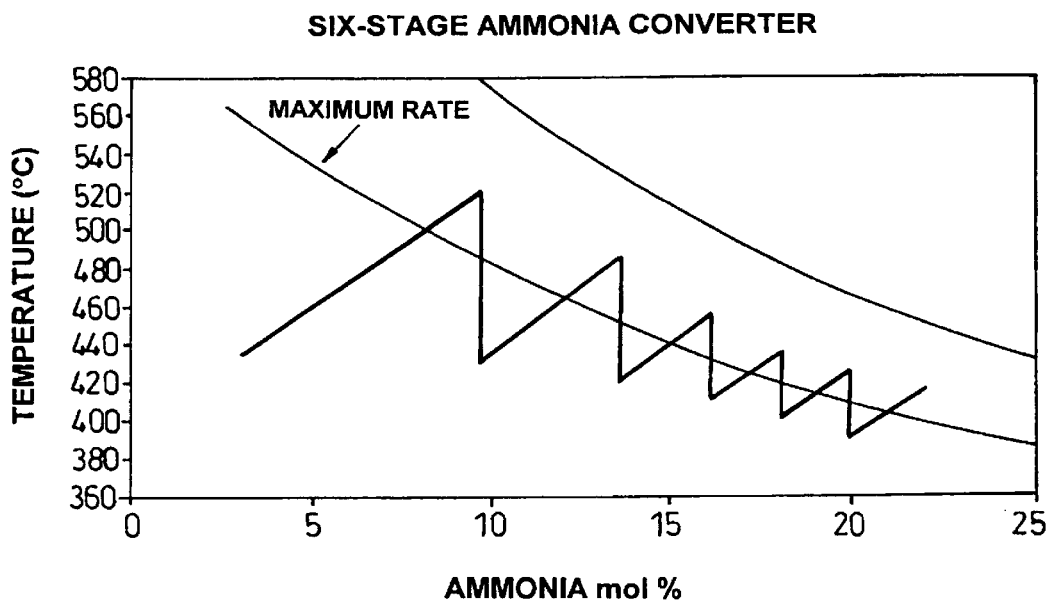
FIG. 7 is a graphical representation of the general form of a six-stage ammonia temperature profile.
Figure 8:
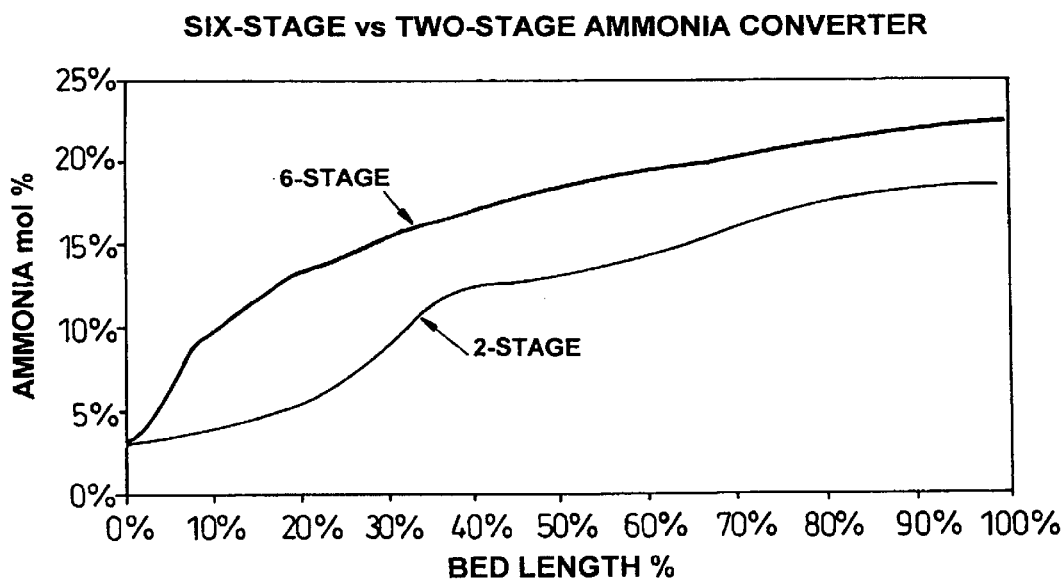
FIG. 8 is a graphical representation of the conversion profile in two-stage and six-stage ammonia converters.

FIG. 7 illustrates the superior approximation (in comparison to the two stage converter of FIG. 2) to the maximum rate curve which can be achieved with six reaction stages. The improvement in conversion of reactants into products which can be achieved in moving from a two-stage to a six-stage converter (keeping the total volume of catalyst constant) is illustrated in FIG. 8: overall conversion can be improved from about 18.5% to about 22.5%.

Figure 9:
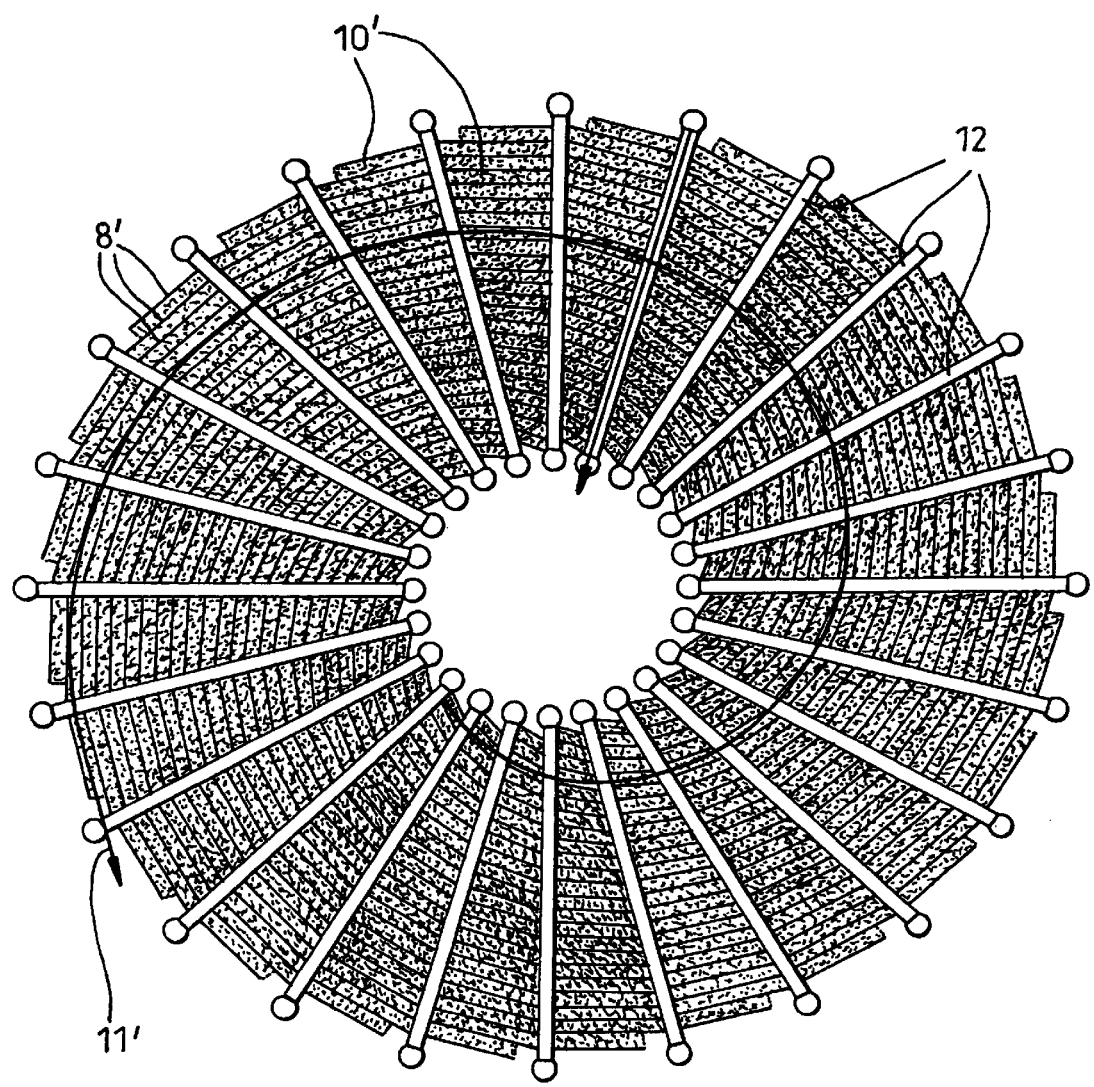
FIG. 9 shows schematically the general configuration of a multi-bed spiral/radial flow reactor wherein straight baffles are used.

FIG. 9 shows a further embodiment of the invention wherein like parts have equivalent numbering and in particular each of the catalyst beds 10' are bounded by straight baffles 8' as opposed to the curved baffles 8 of the beds 10 of the previous embodiments. This embodiment thus has a succession of essentially straight beds 10' in series in the arrangement of the simplest case reactor of FIG. 3 although a series of such straight catalyst beds 10' could be used in the other reactor embodiments described herein. Yet overall the "straight" beds still permit the advantages of a substantially radially outwardly extending spiral flow-path 11' including passage through the transversely disposed PCHE (w.r.t. flow-path) panels.

As with the curved bed reactors the cooling medium passes through the beds 10' from the inner circumference to the outer (or vice versa), and each bed 10' provides a flow path that is increasingly longer as the reactants progressively flow further away from the centre of the reactor.

It can also be seen from FIG. 9 how simple it is to increase the number of beds 10' the reactants pass through. With a relatively small increase in overall bulk size of the reactor (in comparison to an equivalent linearly arranged straight reactor) the reactant path 11' can be effectively significantly lengthened, e.g. as illustrated, the path flows through more than twenty catalyst beds 10' and a similar number of PCHE panels 12.

Figure 10:
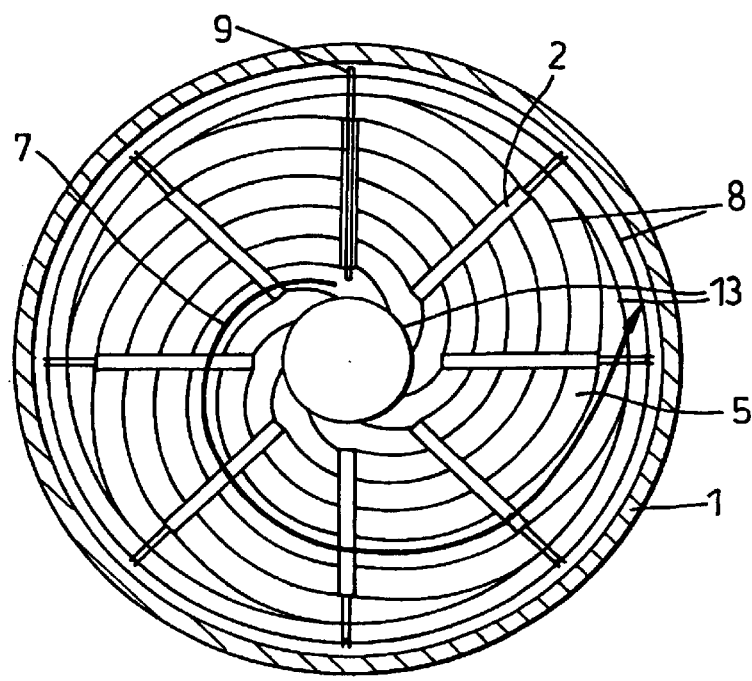
FIG. 10 shows schematically the general configuration of an ammonia converter reactor where the catalyst bed is contained between containment screens.
Figure 11:
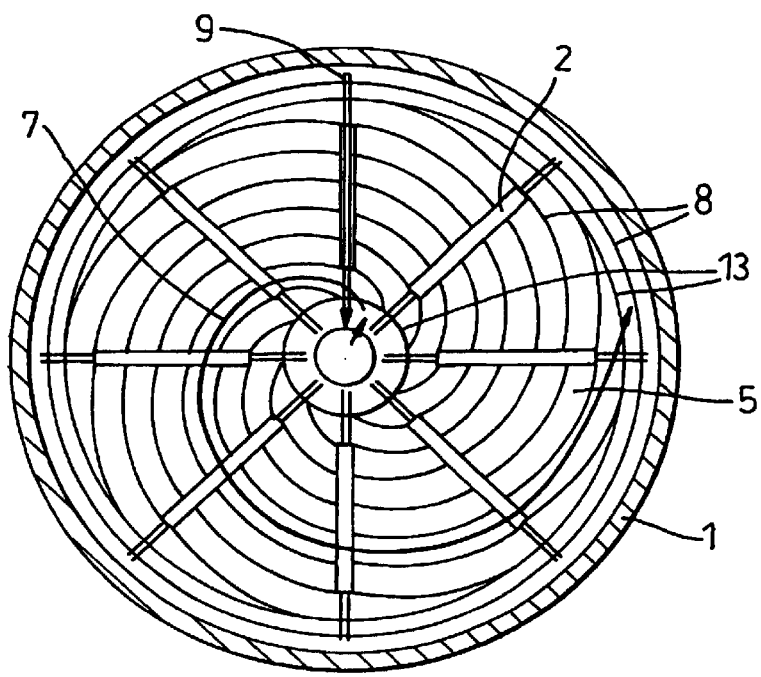
FIG. 11 shows schematically the general configuration of an ammonia converter reactor with cold feed bypass provision where the catalyst bed is contained between containment screens.

FIG. 10 shows an ammonia converter wherein the catalyst beds 5 are contained between two concentric screens 13. The concentric screens 13 better withstand the stresses involved in containing the catalyst. FIG. 11 shows a similar ammonia converter but with a cold feed bypass to the first reactant stage as with FIG. 5.

The main advantages of the present invention over the prior art are:

1. The assembly fits conveniently into a cylindrical vessel, which is particularly important when the reactants are at high pressure.

2. A large fraction of the vessel volume is occupied by catalyst, and a large number of beds can be accommodated.

3. When the reactant stream spirals outwards, the bed length increases as the reaction progresses, so that a substantial reaction step is still achievable even when the reactants are becoming depleted.

4. The cooling medium can pass either counter to the flow of the reactants (from the outside in) or co-flow with the reactants (from the inside out) depending on whether a descending or ascending profile is advantageous.

5. At very high cooling medium re-circulation rates or with phase change the beds can be maintained close to isothermal.

INDUSTRIAL APPLICABILITY

The reactor designs and process for performing chemical reactions under controlled temperature conditions according to the invention as disclosed herein find utility in the field of chemical engineering and are useful in a wide range of industrial scale chemical reactions but may be adapted for smaller scale e.g. laboratory and pilot plant work.

What is claimed is:

1. A reactor comprising:
   (a) an outer wall;
   (b) a plurality of heat exchanger panels arranged within the outer wall at an angle thereto such as to extend inwardly to an interior of the reactor, wherein each of the heat exchanger panels comprises a printed circuit heat exchange (PCHE) plate;
   (c) a plurality of reaction zones separated by the heat exchanger panels but in fluid communication with one another via the heat exchanger panels, and forming thereby a segmented production flow path; and
   (d) baffles located within each reaction zone, wherein each of the baffles extends from a heat exchanger surface of an associated one of the heat exchanger panels to define a boundary for the associated reaction zone and to cause the production flow path to extend between a central part of the reactor to an outer peripheral part thereof.

2. A reactor according to claim 1, wherein the configuration of the production flow path is that of a spiral.

3. A reactor according to claim 1, further comprising two concentric catalyst containment screens, between which a reaction zone is contained.

4. A reactor according to claim 1, wherein the outer wall is curved, the reactor is cylindrically shaped, and the heat exchanger panels are arranged about a central point to thereby define a plurality of sectors each containing at least one reaction zone.

5. A reactor according to claim 4, wherein each sector is divided into a plurality of reaction zones by the baffles.

6. A reactor according to claim 5, wherein each of the baffles is arranged to extend from a heat exchanger surface to define a boundary for an associated reaction zone.

7. A reactor according to claim 5, wherein the baffles are curved.

8. A reactor according to claim 5, wherein the baffles are straight.

9. A reactor according to claim 5, wherein the baffles are corrugated.

10. A reactor according to claim 4, wherein the heat exchanger panels are arranged radially about a longitudinal axis of the reactor.

11. A reactor according to claim 1, wherein the reaction zones comprise catalyst beds.

12. A reactor according to claim 1, wherein the configuration the production flow path is substantially that of a spiral.

13. A reactor according to claim 1, further comprising two catalyst containment screens, between which a reaction zone is contained.

14. A reactor according to claim 1, wherein
the outer wall comprises a containment shell;
the plurality of heat exchanger panels are spaced circumferentially around a longitudinal axis of the containment shell so as to form reaction zones therebetween;
a plurality of catalyst beds are disposed within the reaction zones;
and the baffles comprise a plurality of baffles that are located in the containment shell to form at least one flow path in the catalyst beds, wherein the flow path contains a plurality of segments that are bounded by the panels and that are connected with one another via passageways in the panels, and wherein additional passageways are formed in the panels for the passage of a heat exchange medium therethrough.

15. A reactor according to claim 14, wherein
the containment shell is at least essentially cylindrical in shape,
each of the panels extends at least generally radially with respect to the longitudinal axis,
the baffles are arranged relative to one another and to the panels to cause the flow paths to be at least generally spiral-shaped.

16. A reactor according to claim 15, wherein the baffles are curved.

17. A reactor according to claim 15, wherein the baffles are straight.

18. A reactor according to claim 14, wherein each of the additional passageways has an inlet in fluid communication with a source of the heat exchange medium and an outlet.

19. A reactor according to claim 18, wherein the additional passageways open into an inlet of the flow path, thereby permitting feed reactants to be used as the heat exchange medium.

20. A reactor according to claim 14, wherein a first manifold communicates with the inlets of the additional passageways and a second manifold communicates with the outlets of the additional passageways, one of the first and second manifolds surrounding the catalyst beds and the other of the first and second manifolds being surrounded by the catalyst beds.

* * * * *